United States Patent [19]
Gerat

[11] 3,857,147
[45] Dec. 31, 1974

[54] METHOD OF MANUFACTURING BEARING RACES BY ROLLING

[75] Inventor: Jean Gerat, Annecy, France

[73] Assignee: Societe Nouvelle De Roulements, Annecy, France

[22] Filed: July 9, 1973

[21] Appl. No.: 377,653

[30] Foreign Application Priority Data
Aug. 9, 1972 France .................................. 72.28787

[52] U.S. Cl. ........................................... 29/148.4 R
[51] Int. Cl. .............................................. B21h 1/12
[58] Field of Search.. 29/148.4 R, 148.4 A, DIG. 32

[56] References Cited
UNITED STATES PATENTS
3,769,671  11/1973  Knapp ........................... 29/148.4 R

*Primary Examiner*—Thomas H. Eager
*Attorney, Agent, or Firm*—Stevens, Davis, Miller & Mosher

[57] ABSTRACT

Method of rolling outer races of bearings in a die by means of a rolling tool roller operating under overhanging conditions in a blank of the race to be rolled, which consists in cold treating the race blank having a smaller diameter than said die, the treatment comprising preliminary rotating the roller at its contemplated rolling speed in the blank and, under constant stress conditions, causing the roller to penetrate into the blank, rolling this blank until the die is filled therewith, upsetting the blank material laterally while gauging the race, and then producing an initially slow backward movement of the roller in order to preserve the aforesaid gauging.

2 Claims, 9 Drawing Figures

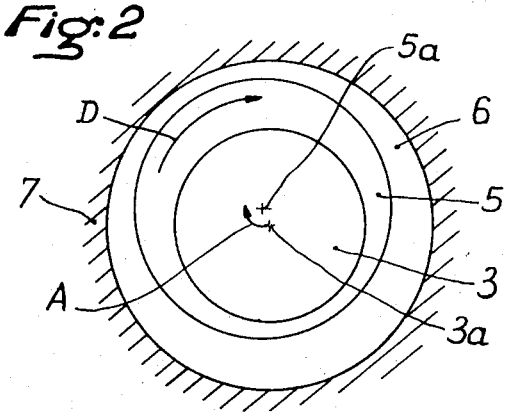
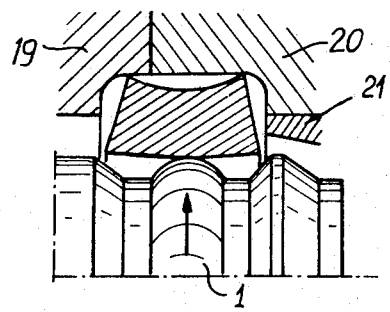
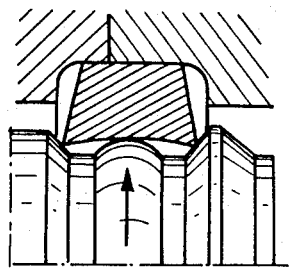
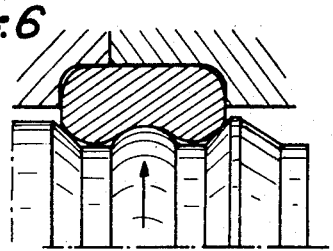
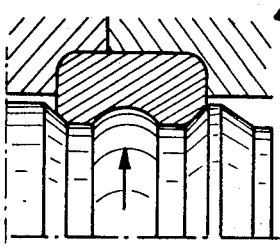
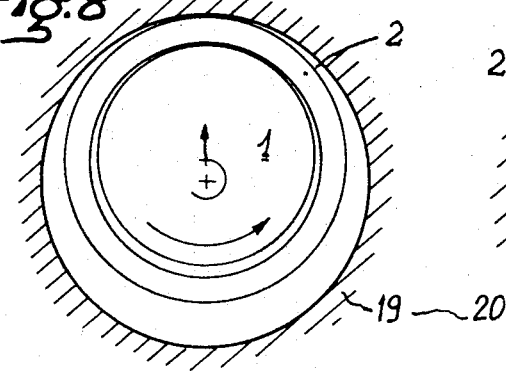
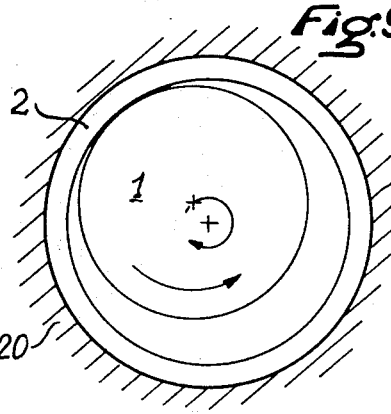

METHOD OF MANUFACTURING BEARING RACES BY ROLLING

The present invention relates to a method of manufacturing rings, races or like annular members or elements, and more particularly bearing races, such as ball-races, roller-races or needle-races, by the so-called cold rolling method, applied to ring or annular blank within the dimensional tolerances and with the surface conditions usually obtained by applying the conventional tool machining operation followed by the lapping of the race grooves in workpieces of this type.

Although the manufacture of inner bearing races having their bearing grooves formed on the outer peripheral surface can be contemplated by applying conventional rolling methods involving the use of conventional means such as external rolling tools with rollers mounted on members having a rigidity sufficient for transmitting the high distorting pressures necessary for rolling bearing steels, the manufacture of outer races having their grooves formed on the inner peripheral surface is attended by specific problems, since the shaping roller must have a diameter smaller than that of the bore of the blank ring to be submitted to the rolling operation.

Methods are already known wherein the rolling tool roller is wedged on either side of the blank ring by means of bearings or bearing rollers transmitting the pressure efforts thereto.

However, this method is ill suited for rapidly and automatically feeding and removing the blanks, as required in mass production.

Only the known methods wherein the rolling tool or roller is held from one side only, therefore in overhanging relationship, permit this easy and rapid feeding and discharge from the side opposite the roller support means. However, the lack of strength of the overhanging roller support means restricted the use of this rolling technique to hot-rolling processes in which the bearing efforts are reduced considerably in comparison with those required for carrying out a cold-rolling operation. Hot-rolled blanks must subsequently be finished to the end dimensions by machining.

In this application a method of hot-rolling rings or races is known wherein the roller tool mounted for free rotation on its spindle mounted in turn eccentrically in one of a pair of sleeves eccentric to each other is pressed against the race to be shaped by the action of a hydraulic braking device adapted to modify the angular setting of the sleeves, and therefore the eccentricity of the roller axis in relation to the race axis.

Although the absence of adjustment of the pressure stroke of the roller, controlled in a passive manner by the braking action, and the sudden contact between the roller and the workpiece can be adapted to a hot rolling operation and to the plasticity of the metal to be shaped, they could not be accepted in a cold rolling operation in which the considerable stress involved would most probable lead to the binding of the surfaces in mutual contact and wherein the bearing pressure must consequently be strictly controlled.

Basically, the method of this invention for rolling outer bearing races in a die with the assistance of a roller tool operating in overhanging relationship in a ring blank to be rolled, is characterised in that it consists in cold treating a blank having an inner diameter smaller than that of the die, according to a treatment procedure comprising the following steps:

rotatably driving the tool roller on itself at a speed corresponding to its rolling speed within the blank;

causing the tool roller to penetrate into the blank until it engages the entire rolling surface, by producing a constant-stress feed, after absorbing its elastic deformation;

rolling the blank in the die by producing an additional feed under constant stress of the tool roller, until the blank fills completely the die with its outer surface;

driving the blank laterally by producing an additional feed under constant stress, this action being followed by a gauging rolling action without any feed until the final dimensions of the race are obtained;

producing a slow initial backward movement for absorbing the strain distortions of the means driving the roller tool in order to preserve the aforesaid gauging.

This method may be carried out by using the tool roller mounted on a rotary tool-holding spindle mounted in turn in a known manner in an eccentric position in one of the mutually eccentric sleeves of said pair driven for rotation in a fixed frame structure in order to produce the necessary rolling action, the feed being obtained through their mutual angular displacement under constant and adjustable stress according to the diameter of the blanks to be rolled.

A typical application of method of this invention will now be described with reference to the attached drawings, in which:

FIG. 2 is a diagrammatic end view illustrating the relative arrangement of the spindle and the eccentric sleeves;

FIGS. 4 to 7 are half views in axial section illustrating the various steps of the blank rolling operation within the die, and FIGS. 8 and 9 are end views of the tool, blank and die assembly during a rolling operation.

Figure 1:
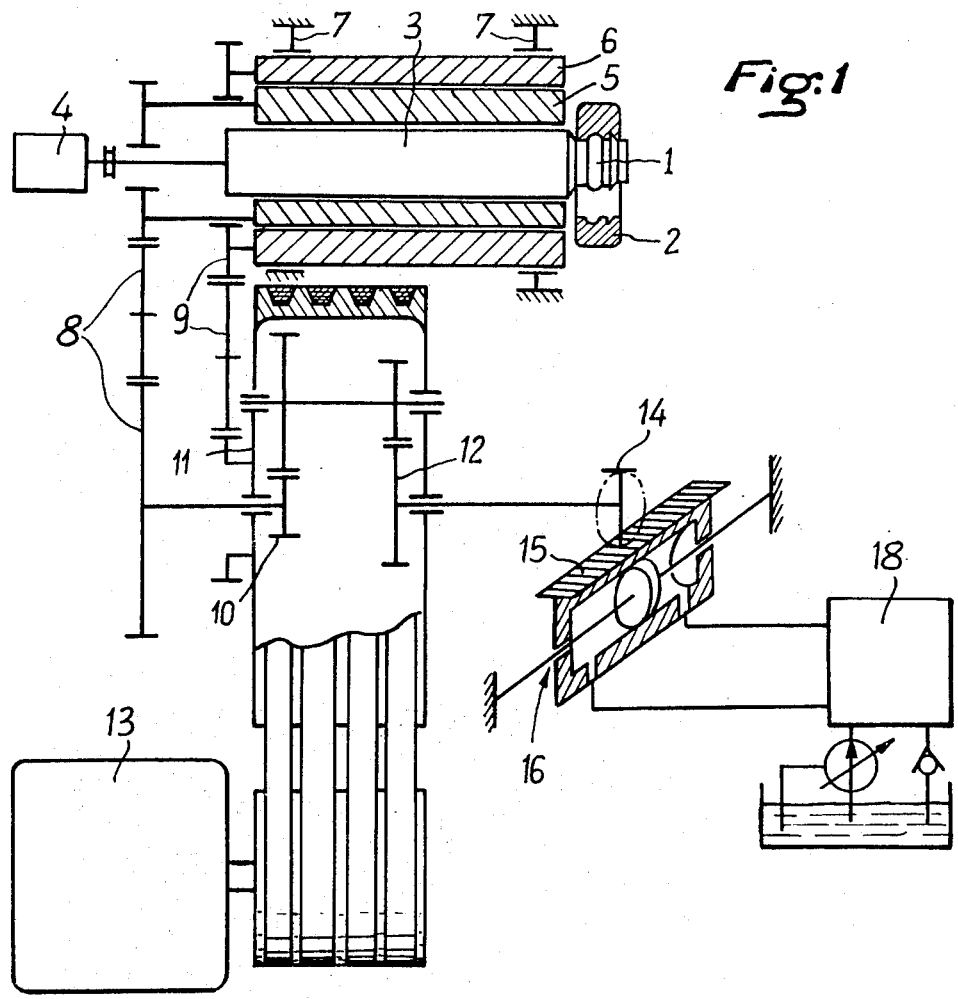
FIG. 1 illustrates diagrammatically the kinematic chain of the means controlling the rolling tool roller.

As illustrated in FIG. 1, the roller tool 1 engaged in a blank 2 to be rolled is mounted on a spindle 3 rotatably driven about its axis from a hydraulic motor 4 at a speed corresponding to that constituting the initial rolling speed of the roller in the blank, in order to avoid at that time any relative slip between the two parts. The motor 4 may be short-circuited, i.e. operated as a hydraulic pump, under the action of roller 1, during the rolling phase, in which the roller entrainment due to its contact with the blank becomes a driving force, considering the increment in diameter of the blank during the rolling operation. This drive is obtained through the medium of a pair of rotary eccentric sleeves 5 and 6, the spindle being mounted eccentrically in the sleeve 5, the outer sleeve 6 revolving in a fixed frame structure 7.

The sleeves 5 and 6 are rotatably driven from two trains of gears designated generally by the reference numerals 8 and 9, and connected to a sun wheel 10 and to the planet carrier 11 of an epicyclic gear train comprising twin planet pinions, respectively, one set of planet pinions co-acting with a reacting sun gear 12 while the planet carrier is rotatably driven from a motor 13 from which, consequently, the assembly 3, 5 and 6 is driven. These trains of gears are such that the sleeves 5 and 6 are driven at the same speed but may be subjected to a relative angular displacement as will be explained hereinafter.

In fact, FIG. 2 illustrates the manner in which a relative angular phase displacement D of sleeve 5 (centered to 5a) in relation to sleeve 6 can produce a lead A of the roller-supporting spindle in relation to its center 3a merging in this case with that of the sleeve 6 in the position illustrated.

The relative angular displacement of sleeves 5 and 6, and therefore the lead of the tool or roller 1 are controlled by means of the reaction sun wheel or gear 12 with the assistance of a pinion 14 rigid therewith and responsive to a hydraulically actuated rack 15, rigid in this example with the movable cylinder of a fixed-piston hydraulic actuator the movement of which is controlled by a variable output hydraulic pump 17 responsive to control means shown in block form at 18, and which may be of manual or automatic type, for producing the blank treatment cycle according to the method of this invention.

This hydraulic-pressure control system operating through the medium of gears and rotary members is relatively sensitive and avoids undesired and detrimental accidental overpressures and jamming. The pressure in the circuit permits of adjusting the effort as a function of the blank to be transformed.

Figure 3:
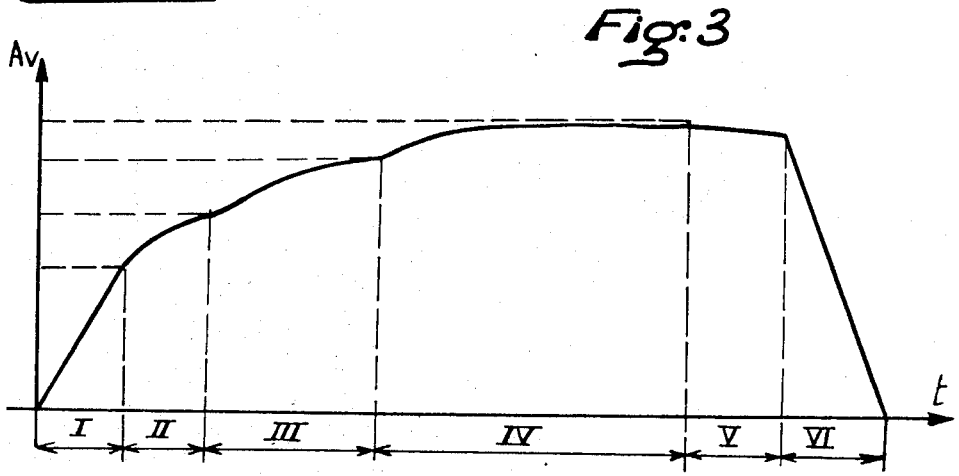
FIG. 3 is a diagram showing the sequence of the forward feed and backward movement of the tool in the method of this invention, the time $t$ being plotted in abscissa and the feed $\Delta v$ in ordinates.

The diagram of FIG. 3 illustrates as a function of time $t$ the complete feed and return steps or movements of the roller tool, FIGS. 4 to 9 illustrating some of these steps. Besides, FIG. 4 illustrates the initial cross-sectional contour of the workpiece blank 2 as obtained by cutting same from a stock tube, for instance by means of a roller cutting or like operation. This blank is previously positioned around the tool roller 1 in a two-section die 19, 20 of the controlled opening and closing type, this die further comprising a feed push member 21 for operating through the die, the inner diameter of this die being of course greater than the outer diameter of the blank.

The second phase I of FIG. 3 corresponds to the fast approach movement of the tool roller 1 which is controlled by directing fluid under pressure into said hydraulic actuator 16, the end of this step being illustrated in FIG. 4, in which the workpiece blank is urged by the tool roller for engagement with the inner space of the die.

Considering the rotation of the assembly comprising the sleeves 5 and 6 and the spindle 3, rotating the tool roller 1 by means of the spindle 3 and motor 4 preliminary to the bearing engagement between the tool roller and the bland will avoid any risk of seizing the blank at the beginning of the rolling operation.

The following three steps II, III and IV of the feed movement at decreasing speed permit of subjecting the roller to the action of a substantially constant stress. This sequence of three successive steps consisting in pressing the roller contour against the blank (step II), then in rolling the blank (step III) and stamping the blank (step IV) is adjusted by the test and try method. It is followed by a step V consisting of a slow backward movement for preventing any out-of-round from developing in the groove which might result from a residual feed due to stress distortion in the kinematic driving chain, which could occur during a rapid backward movement of the tool roller. This slow backward movement is followed by a fast backward movement of tool 1 (step VI) for restoring the tool to its initial position of zero eccentricity in relation to the frame structure.

With this cycle it is possible to obtain a good dimensional reproductibility of the workpieces within tolerances corresponding to those of equivalent workpieces obtained by conventional machining operations. Feeding the roller under constant stress during each working step ensures a proper distribution of the distorted metal at the end of each step without having to exert abnormal pressures thereagainst.

It will be seen notably from FIGS. 5 and 6 that step II begins with an elastic distortion of workpiece 2 and with the pressing of this workpiece against the bottom of the die cavity or impression, and is continued by the impression of the groove and of the lateral bevels, until the complete contour of the tool roller engages the workpiece, which is then in the condition shown in FIGS. 6 and 8. During the next step II, the blank is rolled and elongated until it fills completely the die cavity, as illustrated in FIGS. 7 and 9. Then the step IV producing a gradually decreasing feed ending to a zero feed is adapted to firstly drive the metal of, and eventually gauge, the finished workpiece.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed is:

1. Method of rolling outer races of bearings in a die by means of a rolling tool roller operating under overhanging conditions in a race blank to be rolled, wherein a race blank having a smaller diameter than said die is subjected to a cold treatment comprising the following steps: rotatably driving the tool roller on itself at a speed corresponding to its rolling speed within the blank; causing the tool roller to penetrate into the blank until it engages the entire rolling surface, by producing a constant-stress feed, after absorbing its elastic deformation; rolling the blank in the die by producing an additional feed under constant stress of the tool roller, until the blank fills completely the die with its outer surface; driving the blank laterally by producing an additional feed under constant stress, this action being followed by a gauging rolling action without any feed until the final dimensions of the race are obtained; and producing a slow initial backward movement for absorbing the strain distortions of the means driving the roller tool in order to preserve the aforesaid gauging.

2. Method of rolling blanks as set forth in claim 1, wherein said steps are preceded by a fast-approach step and followed by a fast backward movement step.

* * * * *